(12) United States Patent
McDonald

(10) Patent No.: US 7,826,986 B2
(45) Date of Patent: Nov. 2, 2010

(54) METHOD AND SYSTEM FOR OPERATING A MASS FLOW CONTROLLER

(75) Inventor: R. Mike McDonald, Fort Collins, CO (US)

(73) Assignee: Advanced Energy Industries, Inc., Fort Collins, CO (US)

(*) Notice: Subject to any disclaimer, the term of this patent is extended or adjusted under 35 U.S.C. 154(b) by 103 days.

(21) Appl. No.: 12/238,879

(22) Filed: Sep. 26, 2008

(65) Prior Publication Data

US 2010/0080262 A1 Apr. 1, 2010

(51) Int. Cl.
*G01F 1/00* (2006.01)

(52) U.S. Cl. ............. 702/45; 702/50; 702/100; 700/275; 700/281; 700/282; 165/295; 73/1.16; 73/23.2; 73/861.01; 48/198.6

(58) Field of Classification Search .......... 702/45, 702/50, 100; 700/275, 281, 282; 165/295; 73/1.16, 861.01, 23.2; 48/198.6
See application file for complete search history.

(56) References Cited

U.S. PATENT DOCUMENTS

| | | | |
|---|---|---|---|
| 4,418,568 A | 12/1983 | Surman | |
| 4,658,855 A | 4/1987 | Doyle | |
| 4,685,331 A | 8/1987 | Renken | |
| 5,062,446 A | 11/1991 | Anderson | |
| 5,082,517 A * | 1/1992 | Moslehi | 156/345.26 |
| 5,279,154 A | 1/1994 | Varva | |
| 5,621,180 A * | 4/1997 | Simon et al. | 73/864.52 |
| 5,669,408 A | 9/1997 | Nishino | |
| 5,816,285 A | 10/1998 | Ohmi | |
| 6,044,701 A | 4/2000 | Doyle | |
| 6,216,726 B1 | 4/2001 | Brown | |
| 6,289,746 B1 | 9/2001 | Fu | |
| 6,343,617 B1 | 2/2002 | Tinsley | |
| 6,354,150 B1 | 3/2002 | Rudent | |
| 6,360,772 B1 | 3/2002 | Wu | |
| 6,389,364 B1 | 5/2002 | Vyers | |
| 6,640,822 B2 | 11/2003 | Tinsley | |
| 6,647,776 B2 | 11/2003 | Kohmura | |
| 6,681,787 B2 | 1/2004 | Tinsley | |
| 6,712,084 B2 | 3/2004 | Shajii | |
| 6,725,166 B1 | 4/2004 | Luchner | |
| 6,779,394 B2 | 8/2004 | Ambrosina | |
| 6,826,953 B2 | 12/2004 | Wang | |
| 6,918,295 B1 | 7/2005 | Shajii | |
| 6,932,098 B2 | 8/2005 | Shajii | |
| 7,000,463 B1 | 2/2006 | Shajii | |
| 7,073,392 B2 | 7/2006 | Lull | |
| 7,107,834 B2 | 9/2006 | Meneghini | |
| 7,136,767 B2 | 11/2006 | Shajii et al. | |

(Continued)

*Primary Examiner*—Eliseo Ramos Feliciano
*Assistant Examiner*—Elias Desta
(74) *Attorney, Agent, or Firm*—Neugeboren O'Dowd PC; Sean R. O'Dowd

(57) ABSTRACT

A system and method for operating a mass flow controller is described. One embodiment validates the operation of a mass flow controller thermal sensor, including detecting zero drift and span drift in the sensor by comparing the thermal sensor output to a pressure sensor output. In one embodiment, each sensor provides a signal to a digital controller or other processing unit and the controller calculates the mass flow rates of a gas flowing through the unit as measured by the sensors. The mass flow rates may then be compared to determine if one of the thermal sensor is operating properly.

6 Claims, 5 Drawing Sheets

U.S. PATENT DOCUMENTS

| | | |
|---|---|---|
| 7,216,019 B2 | 5/2007 | Tinsley |
| 7,216,534 B2 | 5/2007 | Masuichi |
| 7,424,346 B2 | 9/2008 | Shajii |
| 2003/0115949 A1 | 6/2003 | Ambrosina |
| 2006/0059987 A1 | 3/2006 | Melville |
| 2007/0113641 A1 | 5/2007 | Ding |
| 2008/0211510 A1 | 9/2008 | Zolock |

* cited by examiner

METHOD AND SYSTEM FOR OPERATING A MASS FLOW CONTROLLER

INCORPORATION BY REFERENCE

The present application incorporates by reference application Ser. No. 11/680,785, entitled METHOD AND APPARATUS FOR MEASURING THE TEMPERATURE OF A GAS IN A MASS FLOW CONTROLLER, filed Mar. 1, 2007.

FIELD OF THE INVENTION

The present invention relates generally to mass flow controllers. In particular, but not by way of limitation, the present invention relates to methods and apparatus for operating a mass flow controller.

BACKGROUND OF THE INVENTION

A typical mass flow controller (MFC) is a device configured and adapted to control the delivery of a fluid. A specified delivery rate may be set by a user in terms of, for example, cubic centimeters or grams fluid delivered from the MFC per minute. To enable control of the MFC, a typical MFC generates an output signal which is indicative of the actual flow rate of the MFC. This actual flow rate is compared to the specified flow rate and a control valve is adjusted, if necessary, to modify the flow so that the flow of the fluid is released from the MFC at the specified flow rate set point.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present invention may provide a method and system for operating a mass flow controller. For example, some embodiments of the present invention may provide a system and method for validating the operation of a mass flow controller. One illustrative embodiment is a thermal sensor validation system comprising a thermal mass flow sensor, a pressure mass flow sensor, and a digital controller. The thermal mass flow sensor is adapted to produce a first signal—the first signal varying linearly or nonlinearly with a temperature differential between a pair of thermal mass flow sensor sensing elements. Similarly, the pressure mass flow sensor in this embodiment is adapted to produce a second signal which varies linearly or nonlinearly with an upstream and downstream pressure of a main flow line. Finally, the digital controller may be configured to receive the first and second signals, use the signals to calculate a mass flow rate of a substance flowing through the mass flow controller as measured by the sensors, compare the first mass flow rates as measured by the sensors, and validate the output of the thermal mass flow sensor.

Another illustrative embodiment is a method of validating a mass flow controller thermal sensor. One such method comprises producing thermal sensor and pressure sensor signals, modifying the signals, and using the modified signals to calculate a mass flow rate of a substance flowing through a mass flow controller as measured by the thermal and pressure sensors. The mass flow rates are then compared in order to validate that the thermal sensor is operating properly.

Another illustrative embodiment is a method of operating a mass flow controller. One such method comprises directing a flow of gas from a main flow line through a first tube coupled to a first sensor, coupling a second tube to an upstream portion of the main flow line and to a second sensor, and coupling a third tube to a downstream portion of the main flow line and to the second sensor. A first signal is then emitted from the first sensor and a second signal is emitted from the second sensor, the two signals being (i) received by a digital controller, (ii) used to operate a control valve, and (iii) validate the proper operation of the MFC.

These and other embodiments are described in further detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, wherein:

DETAILED DESCRIPTION

Figure 1:
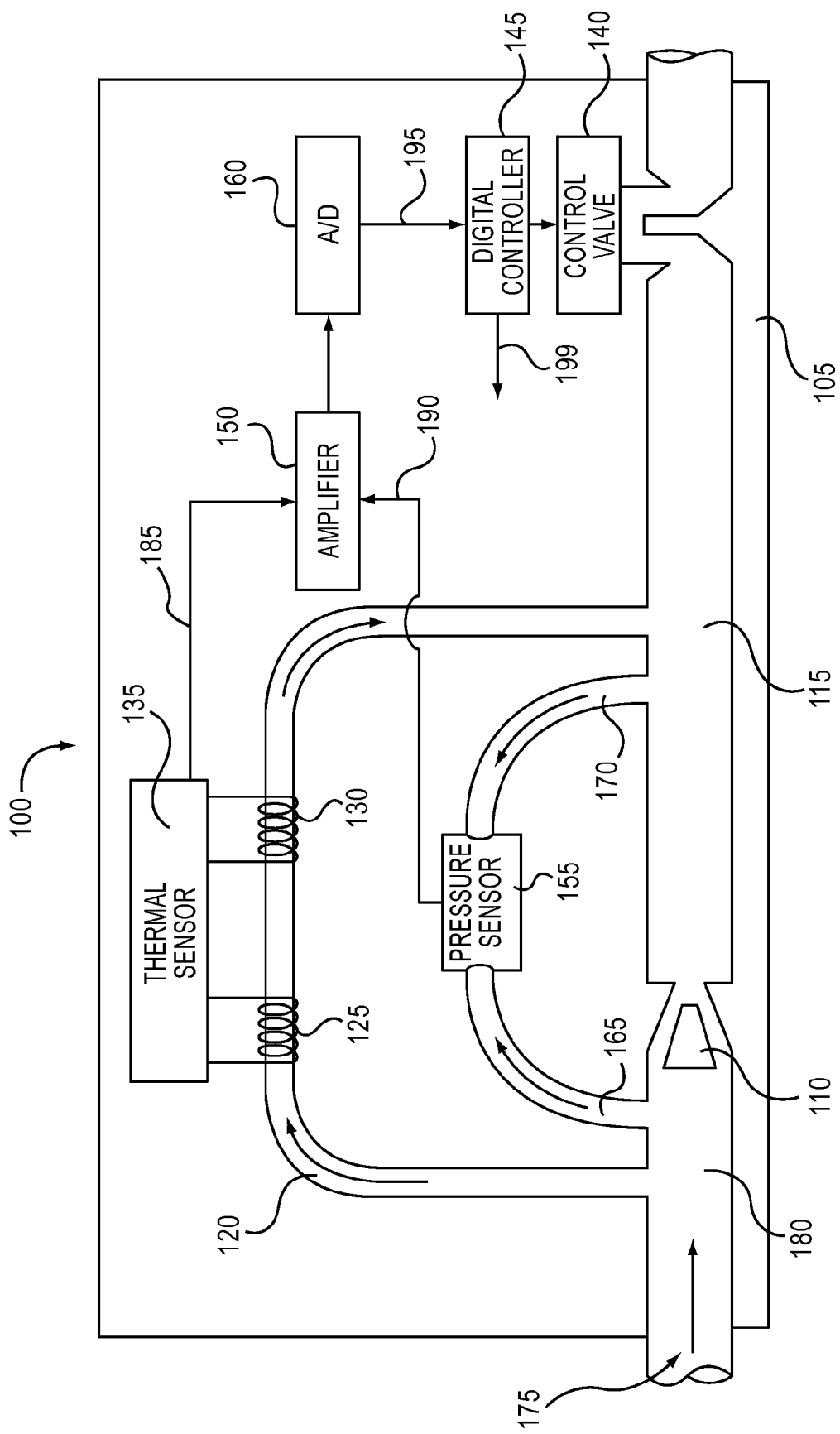
FIG. 1 is a functional block diagram of a mass flow controller in accordance with an illustrative embodiment of the invention.

Referring now to the drawings, where like or similar elements are designated with identical reference numerals throughout the several views where appropriate, and referring in particular to FIG. 1, it is a functional block diagram of a mass flow controller (MFC) 100 in accordance with an illustrative embodiment of the invention is shown. Base 105 of MFC 100 includes a main flow path 175 through which a flow substance, such as, but not limited to, a gas, flows. A bypass 110 directs a constant proportion of gas through a first tube 120 and the main path 175 by creating a pressure differential across the bypass, essentially creating an upstream high pressure gas flow section 180 and a downstream low pressure gas flow section 115.

The first tube 120, a small bore tube in this embodiment, is coupled to a thermal mass flow sensor 135 of the MFC 100. In one embodiment, sensing elements 125 and 130 are wound around the outside of the first tube 120. Each of the sensing elements 125 and 130 may be resistance-thermometer elements, which have a resistance that varies with temperature. However, it is to be appreciated that an embodiment may be comprised of other temperature sensing elements such as, but not limited to, thermopile or infra-red temperature sensing elements.

In addition to the first tube 120, a second tube 165 is coupled to an upstream-main-flow-path-section 180. An opposing end of the second tube 165 is coupled to a pressure sensor 155. One pressure sensor that may be used in an embodiment is a modified Honeywell Model P-30-P differential pressure transducer, manufactured by Honeywell International Inc., of Golden Valley, Minn. A third tube 170 is coupled to the low pressure downstream section 115, with an opposing third tube end coupled to the pressure sensor 155.

The second and third tubes 165 and 170 also comprise small bores in one embodiment, similar to the first tube 120.

A current source (not shown) supplies the thermal sensor 135 and pressure sensor 155 with current. Sensing elements 125 and 130 are supplied with a substantially constant electrical current, resulting in the heating of the first tube 120. Gas flowing through the first tube 120 causes heat to be transferred from the upstream sensing element 125 to the downstream sensing element 130. The change in resistance due to this temperature differential produces a measurable thermal sensor output comprising a first signal 185. The term "signal" may be used simultaneously throughout the specification herein with the term "voltage", where appropriate, and unless otherwise specified.

In one embodiment, the second tube 165 provides an upstream-main-flow-path-section 180 pressure to the pressure sensor 155. In one embodiment, the second tube 165 may be pneumatically coupled to a pressure-sensor-first-piezoelectric-membrane. The third tube 170 provides a downstream-main-flow-path-section 115 pressure to the pressure sensor 155. In one embodiment, the third tube 170 may be pneumatically coupled to a pressure-sensor-second-piezoelectric-membrane, but this is certainly not required, and in other embodiments the pressure may be sensed by pressure transducers known in the art other than piezoelectric membranes. The pressure measured by the piezoelectric membranes or other pressure sensor device produces a pressure sensor output comprising a second signal 190. Embodiments are contemplated which include one or more non-piezoelectric pressure sensors such as, but not limited to, oil-based sensors. Nonetheless, in one embodiment, the pressure sensor may be comprised of a single device adapted to provide both the upstream section 180 and downstream section 115 pressures—for example, a single piezoelectric membrane. Further, an embodiment is contemplated which may have more than one pressure sensor 155 wherein each sensor may be adapted to produce an upstream section 180 and/or a downstream section 115 signal.

Each of the first signal 185 and the second signal 190 may be fed to a printed circuit board assembly, or "PCBA". One PCBA may include a comparator, processor, or other control circuit adapted to control the operation of a control valve 140. For example, the first signal 185 and the second signal 190 may be fed to, and amplified by, an amplifier 150 and subsequently converted from analog signals to a digital signal via an analog-to-digital converter 160 to produce a modified signal 195. The modified signal 195 may include a modified first signal and a modified second signal, which are digital representations of the first signal 185 and the second signal 190, respectively. Further signal linearization and modification may occur prior to processing the signal 195 with a digital controller 145, which in one embodiment includes control logic. Other or additional processing control circuits may also be used. In some embodiments the digital controller 145 may include built-in flash memory and a processor.

It should be recognized that the illustrated arrangement of the components depicted in FIG. 1 is logical and not meant to be an actual hardware diagram; thus the components can be combined or further separated in an actual implementation. Moreover, the construction of each individual component may be realized by a variety of technologies including software, hardware, firmware and/or a combination thereof.

In one exemplary embodiment, the MFC 100 processes the first signal 185 into a first mass flow rate and compares the first mass flow rate with a specified mass flow rate set point, and the control valve 140 is adjusted to maintain the specified mass flow rate set point. Other embodiments may process the second signal 190 to obtain a second mass flow rate and use the second signal 190 or a combination of the first signal 185 and the second signal 190 to adjust the control valve 140. For example, the first signal 185 may be used to adjust the control valve 140 in a first flow range comprising a low gas flow rate and the second signal 190 may be used to adjust the control valve 140 in a second flow range comprising a high gas flow rate. One high gas flow rate may be at least partially comprised of a turbulent gas flow.

In many embodiments, the MFC 100 also validates operation of at least one of the MFC sensors 135 and 155. For example, in order to determine if the thermal sensor 135 is experiencing sensor drift, the first mass flow rate is compared to the second mass flow rate. If the first mass flow rate is within a user-specified boundary of the second mass-flow rate, then the thermal sensor output is determined not to be drifting. If the output is outside of a user-specified range, then drift is occurring in the thermal sensor.

In one embodiment the digital controller 145 is adapted to produce an output signal 199 upon validation of MFC operation. For example, the output signal 199 may be issued upon determining that the thermal sensor 135 is experiencing drift. One output signal may be produced if the first mass flow rate (as measured by the thermal sensor 135) is outside of a 1% range of the second mass flow rate (as measured by the pressure sensor 155). The output signal may be used to inform an MFC 100 operator that the thermal sensor 135 may be malfunctioning. For example, the output signal 199 may be adapted by a display device to issue a warning signal to a user. Furthermore, upon detecting drift or another fault condition in one of the sensors 135, 155, the MFC 100 may only use the output of the other sensor to operate the control valve 140 across the entire flow rate range.

Figure 2:
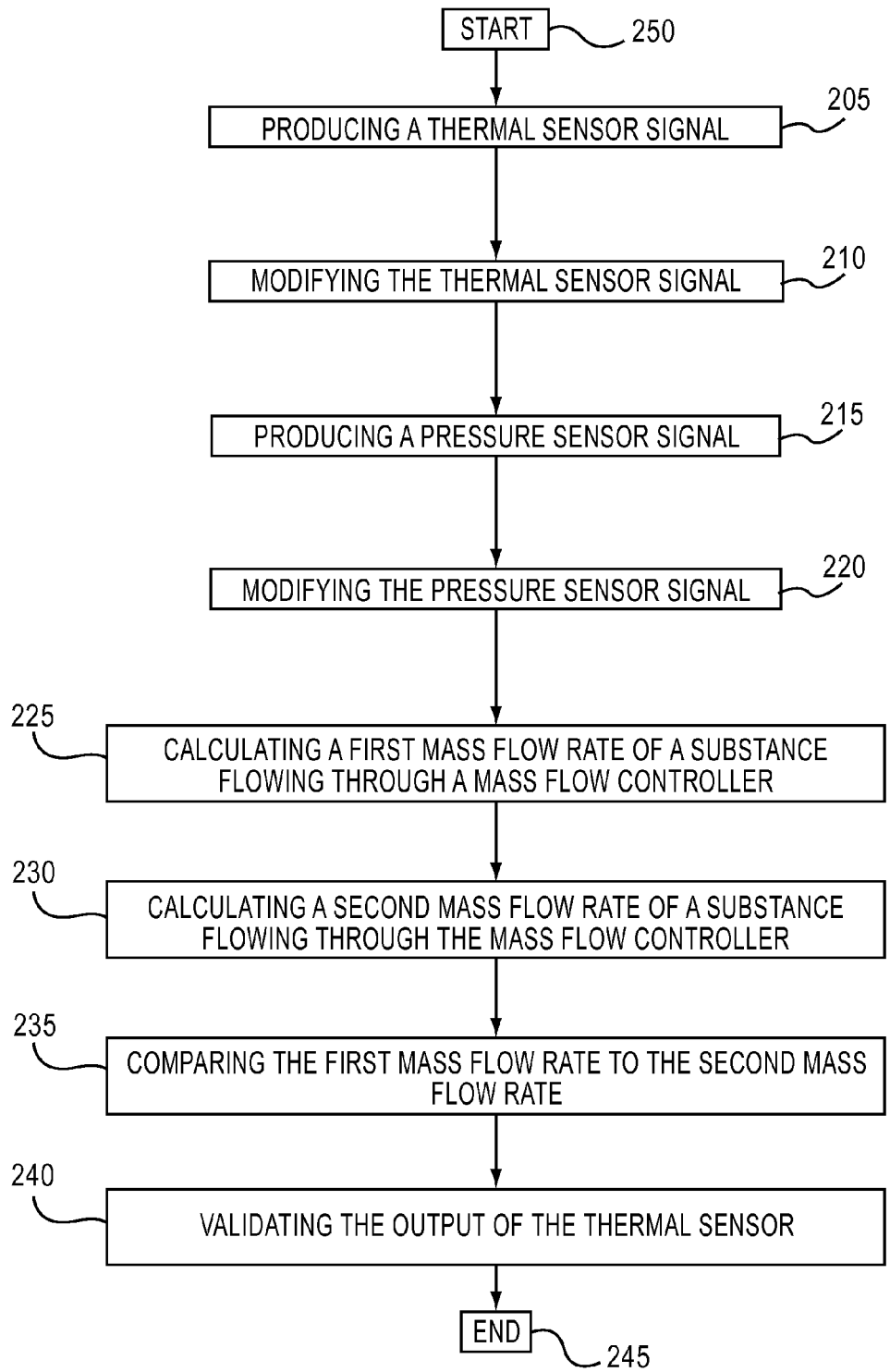
FIG. 2 is a flowchart of a method of validating a mass flow controller thermal sensor in accordance with an illustrative embodiment of the invention.

Referring next to FIG. 2, shown is a flowchart 200 depicting an exemplary method for validating the output of the thermal sensor 135 which may be carried out in connection with the embodiments discussed with reference to FIG. 1. However, the method shown in FIG. 2, and the other methods described herein are not limited for use only with the embodiment shown in FIG. 1. In one method, in order to detect thermal sensor 135 drift, a first mass flow rate calculated from a first signal 185 produced by the thermal sensor 135 is compared to a second mass flow rate calculated from a second signal 190 produced by the pressure sensor 155. At 205, the thermal sensor 135 produces a thermal sensor output voltage, also referred to herein as the first signal 185. At 210, the first signal is then modified (e.g., through amplification, digital conversion, linearization, or otherwise) to at least partially produce the modified signal 195. Using a thermal-sensor-signal-portion of the modified signal, a first mass flow rate of a substance flowing through the mass flow controller 100 is calculated at 225.

A similar procedure is used to determine the second mass flow rate as determined by the pressure sensor 155. For example, at 215, a pressure sensor signal is produced, also referred to as a second signal 190. The second signal 190 may be amplified, digitized, linearized, or otherwise modified to produce at least a portion of the modified signal 195, which is then used to calculate a second mass flow rate of a substance flowing through the mass flow controller 100 (Blocks 220 and 230). The two mass flow rates are then compared to validate the thermal sensor output (Blocks 235 and 240).

Figure 3:
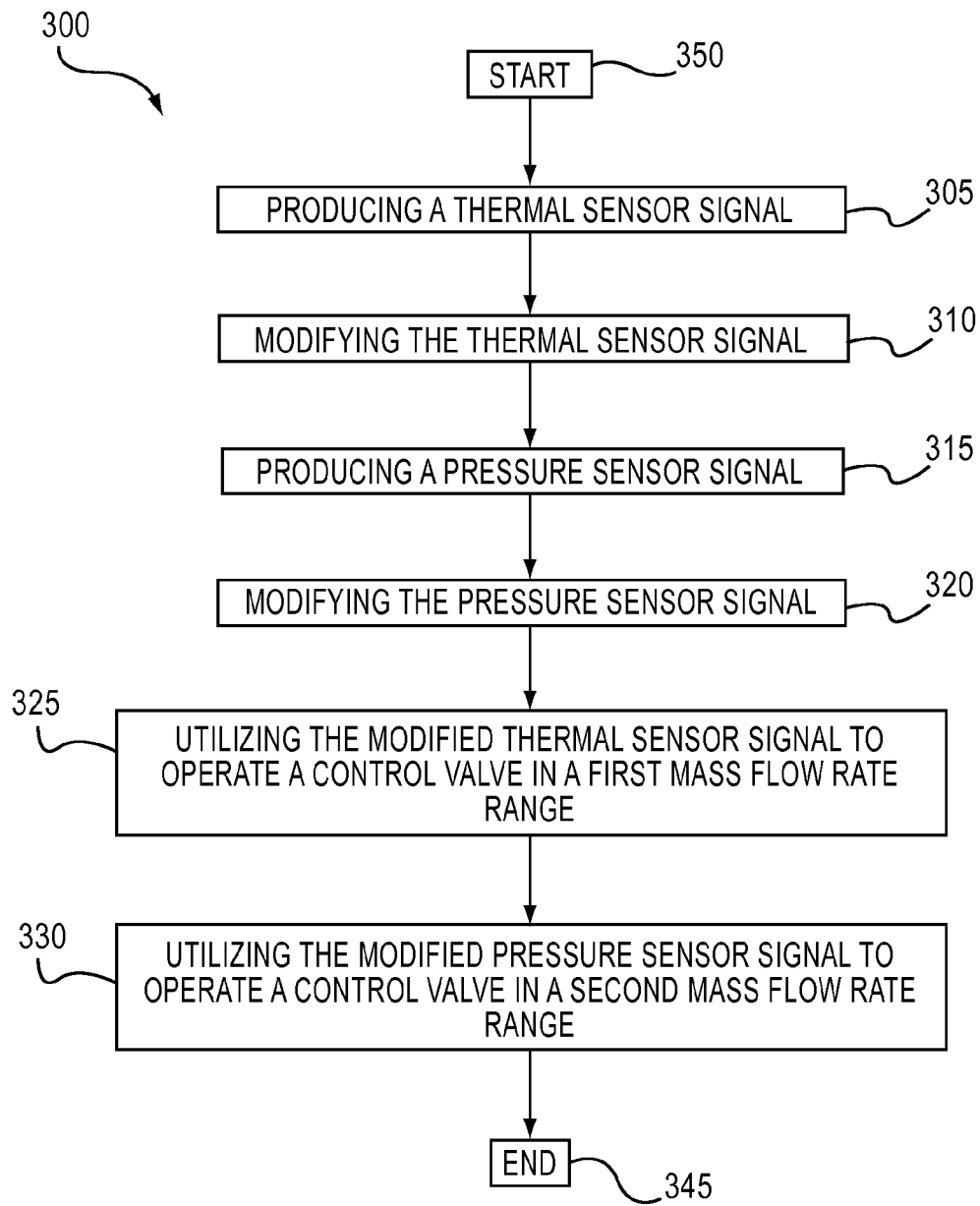
FIG. 3 is a flow chart of a method of validating a mass flow controller thermal sensor in accordance with an illustrative embodiment of the invention.

FIG. 3 is a flow chart of a method for validating the output of a mass flow controller thermal sensor 135 in accordance with another illustrative embodiment of the invention. In the embodiment of FIG. 3, the method through Block 320 proceeds as shown and described above in FIG. 2 through Block 220. At Block 325, the modified thermal sensor signal, which in one method may be a portion of the modified signal 195, is used to operate a control valve 140 in a first mass flow rate range. At block 330, the modified pressure sensor signal is used to operate the control valve 140 in a second mass flow rate range.

For example, the modified signal 195 may be received by the digital controller 145 or other processing unit to calculate the first and second mass flow rates of a gas flowing through the mass flow controller 100. The first and/or second mass flow rates may then be compared to a user-specified set mass flow rate. Based on the comparison(s), a signal may be generated and output to the control valve 140 so that the control valve 140 adjusts the mass flow rate of the gas out of the MFC so that the actual mass flow rate exiting the MFC substantially equals the set mass flow rate. In one method, the thermal sensor signal may be used to operate the control valve in a low flow range and the pressure may be used to operate the control valve in a high flow range.

Figure 4:
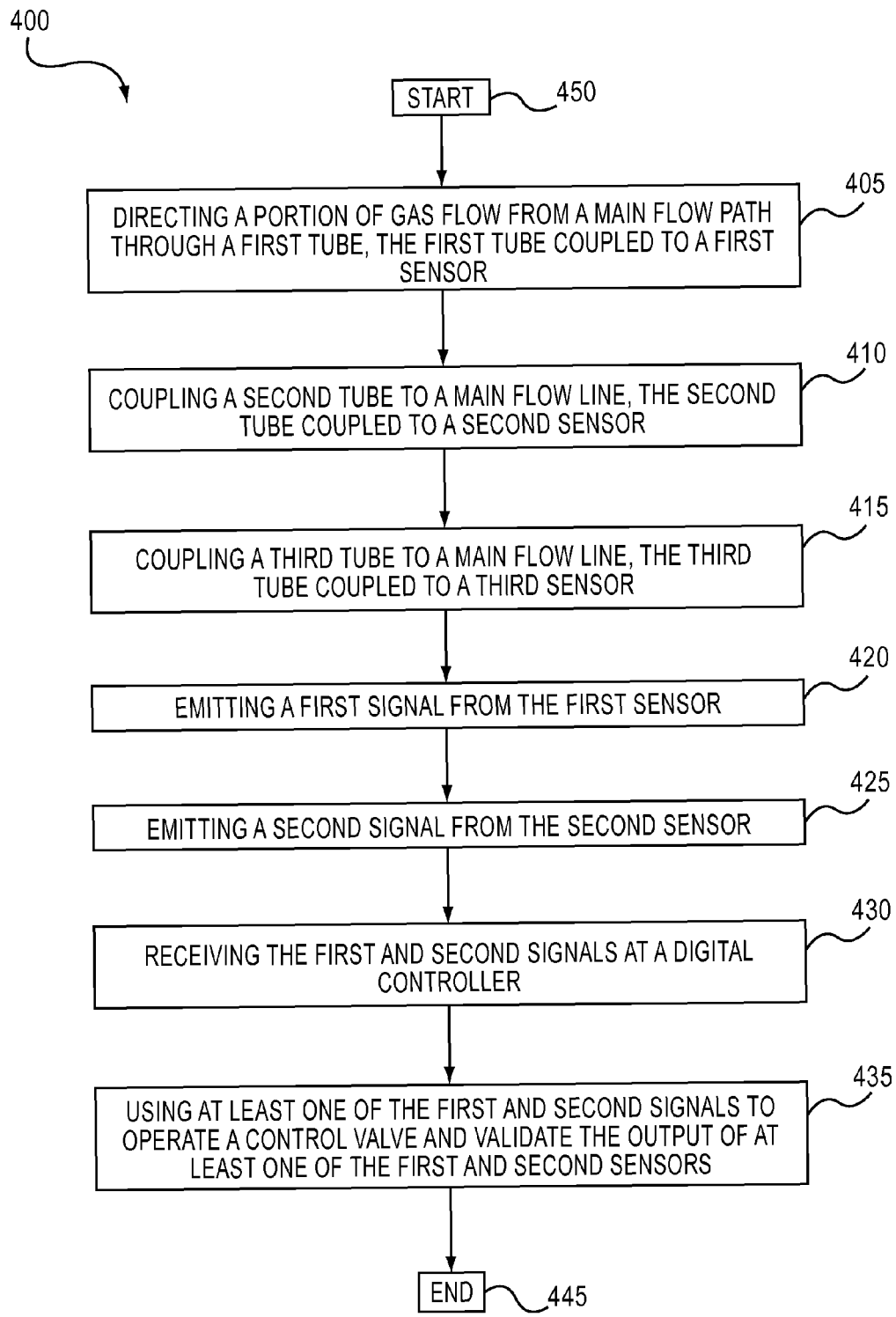
FIG. 4 is a flowchart of a method of operating a mass flow controller in accordance with an illustrative embodiment of the invention.

FIG. 4 is a flowchart of a method of operating a mass flow controller 100 as shown in FIG. 1. However, like the other methods shown and described herein, the method described with FIG. 4 is not limited to the embodiment described in FIG. 1. At 405 in FIG. 4, a portion of gas flowing through the main flow path 175 is directed to flow through the first tube 120. The first tube 120 is also coupled to a first sensor and in one method the first sensor is the thermal sensor 135. For example, the first tube 120 may be coupled to a pair of thermal sensor elements 125 and 130, as shown in FIG. 1. At 410, the second tube 165 is coupled to the main flow path 175 and a second sensor. One second sensor may be the pressure sensor 155. One end of the second tube 165 may be coupled to the pressure sensor 155 and one end may be coupled to an upstream-main-flow-line-section 180, as shown in FIG. 1. At 415, one end of a third tube 170 is coupled to a downstream-main-flow-path-section 115 and the other end of the third tube 170 is coupled to the pressure sensor 155. At 420 and 425, the first sensor and second sensor emit a first and second signals 185 and 190, respectively, which are received in Block 430 by the digital controller 145. At least one of these signals is used to operate the control valve 140 and validate the operation of at least one of the first and second sensors (e.g., sensors 135, 155). For example, the output of a first sensor comprising a thermal sensor 135 may be validated by comparing a first mass flow rate calculated with the first signal to a second mass flow rate calculated with the second signal.

Figure 5:
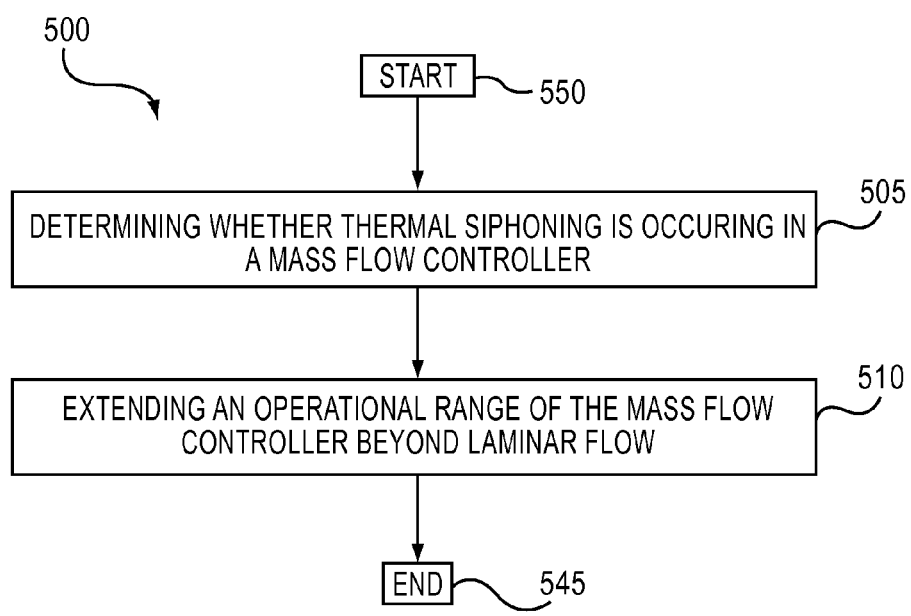
FIG. 5 is a flowchart of a method of operating a mass flow controller in accordance with an illustrative embodiment of the invention.

FIG. 5 is a flowchart for a method of operating a mass flow controller 100 in accordance with another illustrative embodiment of the invention. In the method of FIG. 5, the method proceeds as shown in FIG. 4 through Block 435. At 505, the digital controller 145 in one method determines whether thermal siphoning is occurring in the MFC 100. In one method, thermal siphoning (a parasitic gas flow generated by convection) may be detected by measuring the pressure in at least one of the upstream-main-flow-line-section 180 and the downstream-main-flow-line-section 115. The parasitic gas flow generated by convection inside the MFC 100 may also detected through comparing the change in pressure and/or mass flow rates as measured by the two sensors. Furthermore, at 510, the operational range of the mass flow controller is extended beyond laminar flow.

What is claimed is:

1. A method of operating a mass flow controller comprising,
  directing a portion of gas flow from a main flow line through a first tube, the first tube having a center portion, the center portion coupled to a first sensor;
  coupling a second tube comprising a second-tube-proximal-end and a second-tube-distal-end to the main flow line so that the second-tube-proximal-end is coupled to an upstream-main-flow-line-portion and the second-tube-distal-end is coupled to a second sensor;
  coupling a third tube comprising a third-tube-proximal-end and a third-tube-distal-end to a main flow line, the third-tube-proximal-end coupled to a downstream-main-flow-line-portion and the third-tube-distal-end coupled to the second sensor;
  processing a first signal from the first sensor;
  processing a second signal from the second sensor;
  sending the first and second signals to a digital controller;
  using at least one of the first and second signals to (i) operate a control valve and (ii) validate the proper operation of the mass flow controller.

2. The method of claim 1 wherein,
  directing a flow of gas from a main flow line through a first tube comprises,
    creating a pressure differential across a mass flow controller bypass,
    coupling a proximal end of a first tube to a high gas pressure flow section upstream of the bypass, and
    coupling a distal end of a first tube to a low gas pressure flow section downstream of the bypass;
  coupling a second-tube-proximal-end to an upstream-main-flow-line-portion comprises coupling the second-tube-proximal-end to the high gas pressure flow section; and
  coupling a third-tube-proximal-end to a downstream-main-flow-line-portion comprises coupling the third tube proximal end to the low gas pressure flow section.

3. The method of claim 1 wherein, using at least one of the first and second signals to validate the proper operation of the mass flow controller comprises,
  using a thermal sensor to output the first signal;
  utilizing the first signal to calculate a first mass flow rate;
  using a pressure sensor to output the second signal;
  utilizing the second signal to calculate a second mass flow rate; and
  comparing the first and second mass flow rates.

4. The method of claim 1 further including,
  determining whether thermal siphoning is occurring in the mass flow controller; and
  extending an operational range of the mass flow controller beyond a laminar flow.

5. The method of claim 4 wherein, determining whether thermal siphoning is occurring in the mass flow controller comprises,
  using the second signal to calculate a real-time pressure differential across the mass flow controller bypass; and
  comparing a present pressure differential reading to a past pressure differential reading to determine if thermal siphoning is occurring.

6. The method of claim 4 wherein, extending an operational range of the mass flow controller comprises, controlling the mass flow rate of a turbulent gas flow through a mass flow controller.

* * * * *